(12) United States Patent
Zhang et al.

(10) Patent No.: US 9,890,713 B2
(45) Date of Patent: Feb. 13, 2018

(54) HEAVY DUTY GAS TURBINE INLET SYSTEM

(71) Applicant: General Electric Company, Schenectady, NY (US)

(72) Inventors: Hua Zhang, Greenville, SC (US); Dinesh Venugopal Setty, Bangalore (IN); Laxmikant Merchant, Bangalore (IN); Valery Ivanovich Ponyavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 14/638,472

(22) Filed: Mar. 4, 2015

(65) Prior Publication Data
US 2016/0258357 A1  Sep. 8, 2016

(51) Int. Cl.
| | |
|---|---|
| *F02C 3/30* | (2006.01) |
| *F02C 7/045* | (2006.01) |
| *F02C 7/047* | (2006.01) |
| *B64D 29/00* | (2006.01) |

(52) U.S. Cl.
CPC ............ *F02C 7/045* (2013.01); *B64D 29/00* (2013.01); *F02C 3/30* (2013.01); *F02C 7/047* (2013.01); *F05D 2260/96* (2013.01)

(58) Field of Classification Search
CPC .. F02C 3/30; F02C 7/045; F02C 7/047; F05D 2260/96; B64D 29/00
USPC ........................................ 181/214, 224, 225
See application file for complete search history.

(56) References Cited

U.S. PATENT DOCUMENTS

| | | | | |
|---|---|---|---|---|
| 3,583,417 | A * | 6/1971 | Clark | F02C 7/045 137/15.1 |
| 5,560,195 | A | 10/1996 | Anderson et al. | |
| 5,728,979 | A * | 3/1998 | Yazici | F24F 7/08 181/224 |
| 6,537,490 | B2 | 3/2003 | Han | |
| 8,579,074 | B2 * | 11/2013 | Kosaka | F02C 7/045 181/214 |
| 2003/0221904 | A1 * | 12/2003 | Ludwig | F16L 55/02736 181/224 |

(Continued)

OTHER PUBLICATIONS

European Search Report issued in connection with corresponding EP Application No. 16158298.6 dated Jul. 28, 2016.

*Primary Examiner* — Forrest M Phillips
(74) *Attorney, Agent, or Firm* — Nixon & Vanderhye P.C.

(57) ABSTRACT

A silencer apparatus for a gas turbine inlet system ducting is disclosed. The inlet ducting contains a main silencer and a pre-silencer, and Inlet Bleed Heat ("IBH") located between the silencers. The pre-silencer decreases the noise level from the turbine compressor and makes the air flow/temperature profiles more uniform. The main silencer reduces noise from the IBH and the remaining noise from the compressor to an appropriate level. The main silencer is comprised of a first plurality of sound-absorbing splitters disposed along the gas flow direction in the gas turbine inlet ducting. The pre-silencer is comprised of a second plurality of sound-absorbing splitters disposed along the gas flow direction in the gas turbine inlet ducting, but staggered with respect to the first plurality of splitters to thereby block a direct line of travel for noise acoustical waves from the compressor travelling opposite the gas flow direction in the inlet ducting.

20 Claims, 5 Drawing Sheets

(56) References Cited

U.S. PATENT DOCUMENTS

| | | | |
|---|---|---|---|
| 2006/0054380 A1* | 3/2006 | Doll | E04F 17/04 |
| | | | 181/225 |
| 2009/0241552 A1 | 10/2009 | Vega et al. | |
| 2010/0243370 A1* | 9/2010 | Tuan | B64D 33/02 |
| | | | 181/214 |
| 2010/0263964 A1* | 10/2010 | Kosaka | F02C 7/045 |
| | | | 181/214 |
| 2011/0061968 A1* | 3/2011 | Helenius | F24F 13/24 |
| | | | 181/224 |
| 2015/0184625 A1* | 7/2015 | Desjardins | F02M 35/1255 |
| | | | 181/214 |

* cited by examiner

― Prior inlet system
― Disclosured Inlet system

HEAVY DUTY GAS TURBINE INLET SYSTEM

The present invention relates to gas turbines, and more particularly to an inlet duct silencer for heavy duty gas turbines.

BACKGROUND OF THE INVENTION

Gas turbines range in size from micro-turbines at less than 50 hp (37.3 kW) to large industrial turbines of greater than 250,000 hp (190 kW). The noise produced by gas turbines is primarily high-frequency noise which is generated in the air inlet of the turbine, with a smaller amount coming from the turbine exhaust. The main components of the intake noise generated from the gas turbine are the frequencies generated by the rotation of the turbine's compressor.

Typically, the noise produced in the turbine air inlet is attenuated using an inlet silencer, which is installed in the air inlet ducting between the air filter and the turbine air compressor inlet. A conventional intake silencer used in a large gas turbine typically includes a noise reduction structure comprised of a plurality of sound-absorbing splitters disposed in parallel along a gas flow direction. Typically, the noise reduction efficiency of a conventional intake silencer is not ideal because of a mismatch in noise frequencies to be reduced and the frequencies that can be reduced by the conventional intake silencer. Often, the length the intake silencer is increased based on the amount of noise reduction to be achieved, and thus, typically, the intake silencer is heavy because the splitters are made of a steel frame covered by steel perforated plates that contain sound absorption materials, such as mineral wools.

Thus, a problem that is solved by the present invention is a reduction in the length and a decrease in the cost of the heavy duty gas turbine inlet side due to the combining of two stages of inlet silencers and the turbine inlet bleed heat system.

BRIEF DESCRIPTION OF THE INVENTION

The present invention is directed to an inlet duct design for heavy duty gas turbine ("GT") inlet systems. The inlet duct contains two sets of silencers, i.e., main silencers and pre-silencers, and Inlet Bleed Heat ("IBH") located between the silencer sets. The pre-silencers decrease the noise level from the turbine compressor on average 20-40 dB and make the air flow/temperature profiles more uniform. IBH has a two-pipe design with air coming from the same side (top) for both pipes. The main silencers reduce noise from IBH and the remaining noise from the compressor to an appropriate level.

In an exemplary embodiment of the invention, a silencer apparatus for an inlet system of a gas turbine including an Inlet Bleed Heat is comprised of a main silencer disposed along a gas flow direction in the gas turbine inlet ducting, and a pre-silencer also disposed along the gas flow direction in the gas turbine inlet ducting, with the turbine Inlet Bleed Heat being located between the main silencer and the pre-silencer.

In another exemplary embodiment of the invention, a silencer apparatus for an inlet system of a gas turbine including an Inlet Bleed Heat is comprised of a first plurality of sound-absorbing splitters which are disposed in parallel along a gas flow direction in the gas turbine inlet ducting, and a second plurality of sound-absorbing splitters which are disposed in parallel along the gas flow direction in the gas turbine inlet ducting, with the turbine Inlet Bleed Heat being located between the first and second pluralities of splitters, and the second plurality of splitters being positioned with respect to the first plurality of splitters so that the first and second pluralities of splitters are staggered with respect to one other along the gas flow direction in the gas turbine inlet ducting so as to thereby block a direct line of travel for noise in the form of acoustical waves from the compressor and/or turbine travelling opposite the gas flow direction in the gas turbine inlet ducting.

In a further exemplary embodiment of the invention, a silencer apparatus for a gas turbine inlet system is comprised of a main silencer comprised of a first plurality of sound-absorbing splitters which are disposed in parallel along the gas flow direction in the gas turbine inlet ducting, and a pre-silencer comprised of a second plurality of sound-absorbing splitters which are disposed in parallel along the gas flow direction in the gas turbine inlet ducting, with leading edges of the second plurality of splitters being located a predetermined distance behind trailing edges of the first plurality of splitters, the predetermined distance being measured along the gas flow direction in the gas turbine inlet ducting, the turbine Inlet Bleed Heat being located between the main silencer and the pre-silencer or the first and second pluralities of splitters, the second plurality of splitters being positioned with respect to the first plurality of splitters so that the first and second pluralities of splitters are staggered with respect to one other along the gas flow direction in the gas turbine inlet ducting so as to thereby block a direct line of travel for noise in the form of acoustical waves from the compressor and/or turbine travelling opposite the gas flow direction in the gas turbine inlet ducting, and each of the first and second pluralities of splitters being made of a steel frame covered by steel perforated plates that contain sound absorption materials.

DETAILED DESCRIPTION OF THE INVENTION

The present invention relates to gas turbines, and more particularly to an inlet duct silencer for heavy duty gas turbines.

Figure 1:
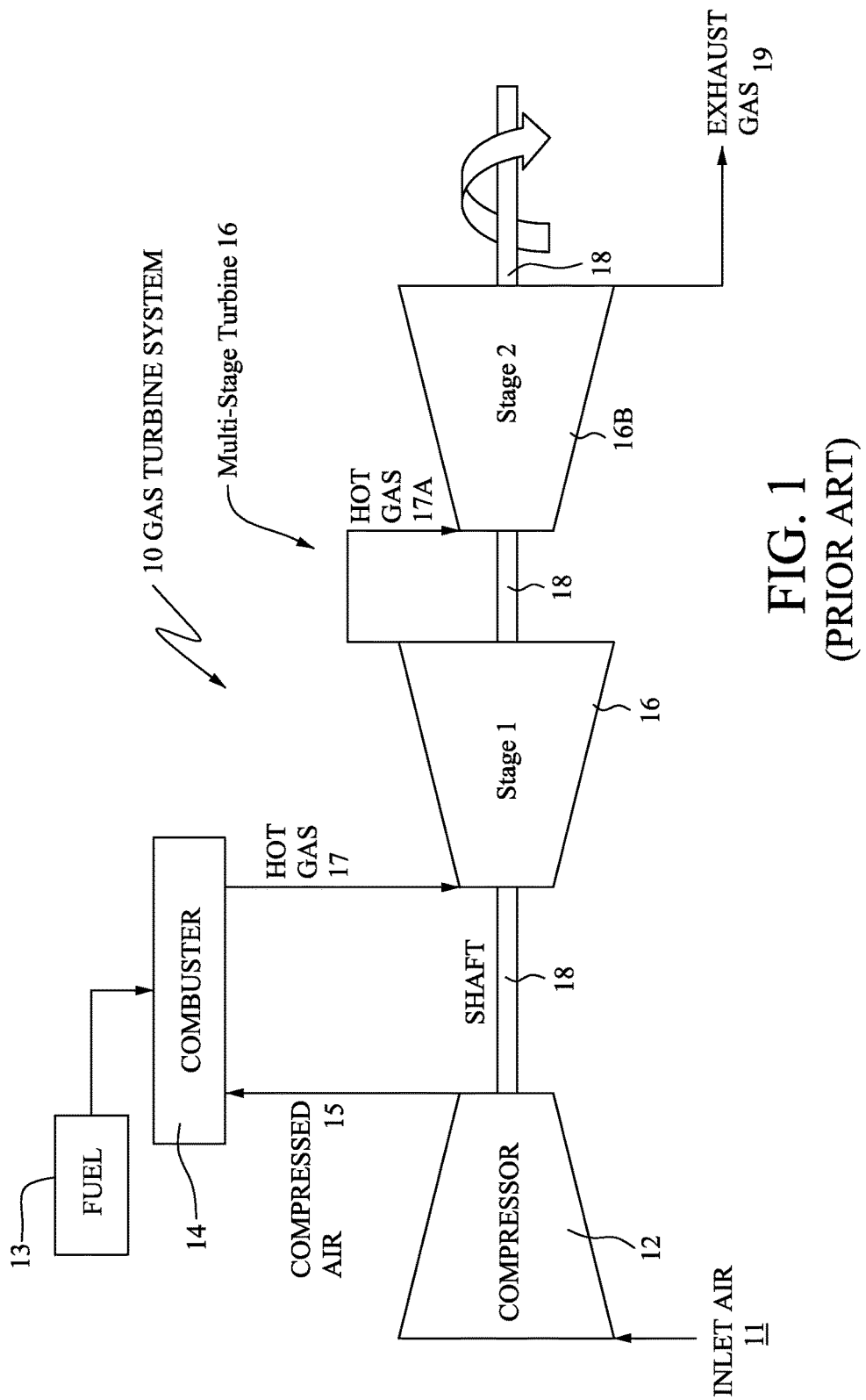
FIG. 1 is a simplified schematic diagram of a multi-stage gas turbine system.

FIG. 1 is a simplified schematic diagram of a multi-stage gas turbine system 10. The gas turbine system 10 shown in FIG. 1 includes a compressor 12, which compresses incoming air 11 to a high pressure, a combustor 14, which burns fuel 13 so as to produce a high-pressure, high-velocity hot gas 17, and a turbine 16, which extracts energy from the high-pressure, high-velocity hot gas 17 entering the turbine 16 from the combustor 14 using turbine blades (not shown in FIG. 1) that are rotated by the hot gas 17 passing through them. As the turbine 16 is rotated, a shaft 18 connected to the turbine 16 is caused to be rotated as well. As shown in FIG. 1, turbine 16 is a multi-stage turbine with the first and second stages shown and designated as 16A and 16B, respectively. To maximize turbine efficiency, the hot gas 17/17A is expanded (and thereby reduced in pressure) as it flows from the first stage 16A of turbine 16 to the second stage 16B of turbine 16, generating work in the different stages of turbine 16 as the hot gas 17 passes through.

Figure 2:
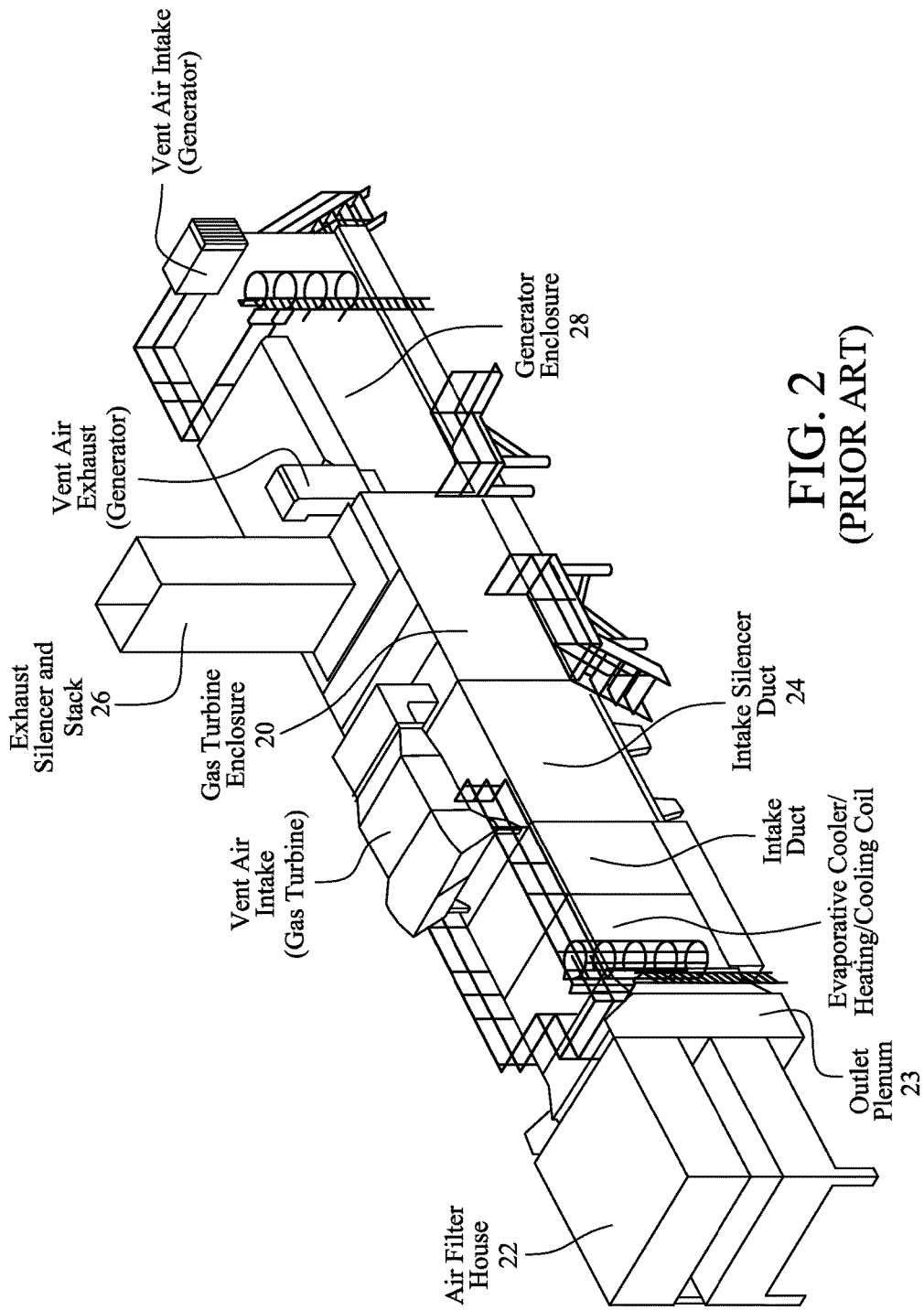
FIG. 2 is a simplified perspective view of one embodiment of the structural housing and ducting used in a gas turbine system.

As noted above, the noise produced in the turbine air inlet is typically attenuated using an inlet silencer, which is installed in the air inlet ducting between the turbine air filter and the turbine air compressor inlet. FIG. 2 is a perspective view of one embodiment of the structural housing and ducting used in a gas turbine system. The compressor 12, combustor 14 and turbine 16 are located in a turbine enclosure 20. Air 11 coming into the compressor 12/combustor 14 and then turbine 16 is filtered by an inlet filter located in an air filter house 22. The filtered air from the inlet filter house 22 is then passed to an outlet plenum 23 and through an evaporative cooler and intake duct to an intake silencer duct 24, which contains an inlet silencer so that the inlet silencer is located between the inlet filter house 22 and the inlet to the air compressor 12 located in housing 20. Hot gases 19 exhausted by the turbine 16 are fed to an exhaust stack 26 which is located after the turbine enclosure 20. The exhaust stack 26 also contains an exhaust silencer. A generator enclosure 28 follows the exhaust stack 26.

Figure 3:
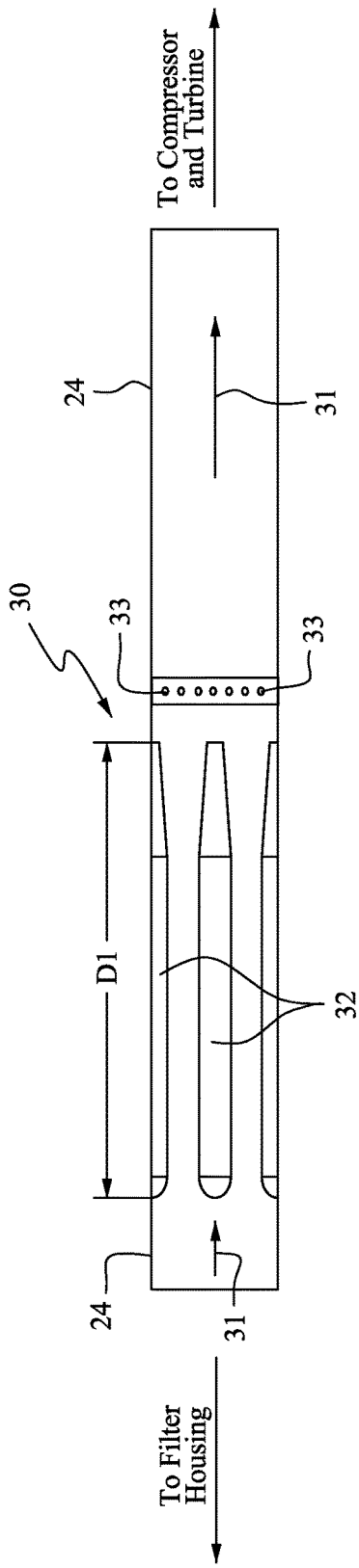
FIG. 3 is a simplified schematic diagram of a partial plan view of the prior art silencers and IBH in the gas turbine inlet ducting in a conventional intake silencer for a gas turbine.

FIG. 3 is a simplified schematic diagram of a partial plan view of a conventional intake silencer 30 used in the intake ducting of a gas turbine system, like system 10 shown in FIG. 1. As shown in FIG. 3, the inlet air 31 flows from left to right, while noise in the form of acoustical waves from the compressor and/or turbine propagates from right to left. The intake silencer 30 includes a noise reduction structure which is comprised of a plurality of sound-absorbing splitters 32, which are disposed in parallel along a gas flow direction 31 in gas turbine intake ducting 24 located between the turbine air filter house 22 and the inlet to the air compressor 12. Each of the splitters 32 has a selected dimension D1 measured along the gas flow direction 31 in the gas turbine intake ducting 24. Typically, the dimension D1 is 104" in a heavy duty gas turbine inlet system. Located between the splitters 32 and the inlet of the air compressor 12 is the turbine Inlet Bleed Heat ("IBH") 33. "Inlet Bleed Heat" is used by heavy duty gas turbines equipped with Dry Low Nox (DLN) combustors to remain in a low emissions Premix Combustion Mode at lower loads than would otherwise be possible.

Figure 4:
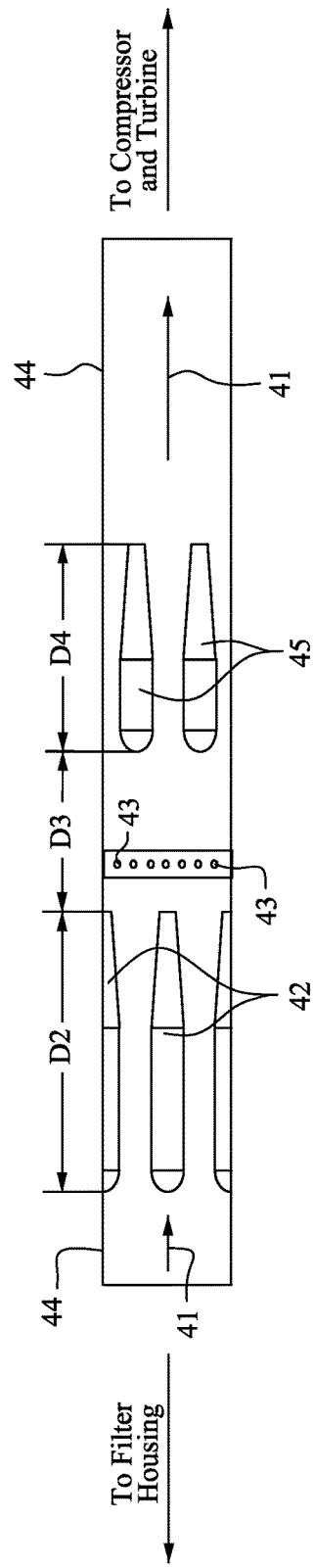
FIG. 4 is a simplified schematic diagram of a partial plan view of the two sets of silencers and Inlet Bleed Heat ("IBH") used in the gas turbine inlet ducting design of the present invention.

FIG. 4 is a simplified schematic diagram of a partial plan view of an inlet silencer 40 according to the present invention used in the inlet ducting of a gas turbine system, again, like system 10 shown in FIG. 1. As shown in FIG. 4, the inlet air 41 flows from left to right, while noise in the form of acoustical waves from the compressor and/or turbine propagates from right to left. The inlet silencer 40 includes a noise reduction structure which includes a main silencer, which is comprised of a first plurality of sound-absorbing splitters 42 disposed in parallel along a gas flow direction 41 in gas turbine inlet ducting 44, and a pre-silencer, which is comprised of a second plurality of sound-absorbing splitters 45 also disposed in parallel along the gas flow direction 41 in gas turbine inlet ducting 44.

The first and second pluralities of sound-absorbing splitters 42 and 45 are located in inlet ducting 44, between the turbine air filter house 22 and the inlet to the air compressor 12. The first plurality of splitters 42 is located "upstream" in the gas flow from the second plurality of splitters 45, closer to the turbine air filter house 22 than the second plurality of splitters 45. Conversely, the second plurality of splitters 45 is located "downstream" in the gas flow from the first plurality of splitters 42, closer to the inlet to the air compressor 12 than the first plurality of splitters 42. Located between the first plurality of splitters 42 and the second plurality of splitters 45 is the turbine Inlet Bleed Heat 43.

It should be noted that the number of sound-absorbing splitters 42 and 45 can be substantially more than the number shown in FIG. 4. By way of example, and not intending to be limiting, one design might use 26 main silencer and/or pre-silencer splitters 42 and 45, respectively, in gas turbine inlet ducting 44, ile another might use or 36 main silencer and/or pre-silencer splitters. Still another design might use fifty (50) main silencer splitters 42 and fifty (50, the same number) pre-silencer type splitters 45 in such gas turbine inlet ducting 44.

Each of the plurality of splitters 42 has a selected dimension D2 measured along the gas flow direction 41 in the gas turbine inlet ducting 44, and which is less than the dimension D1 of prior splitters 32. Each of the plurality of splitters 45 also has a selected dimension D4, which is again measured along the gas flow direction 41 in the gas turbine inlet ducting 44, and which is less than the dimension D2. The leading edges of the second plurality of splitters 45 are located a distance D3 behind the trailing edges of the first plurality of splitters 42. Splitters 42 and 45 are made of a steel frame covered by steel perforated plates that contain sound absorption materials, such as mineral wools, which is the same as splitter 32 shown in FIG. 3. Splitters 45 and splitters 42 are positioned so as to be staggered with respect to one other along the gas flow direction 41 in gas turbine inlet ducting 44, as shown in FIG. 4, to thereby block a "direct line of travel" for acoustical waves travelling from right to left, or opposite the gas flow direction 41 in gas turbine inlet ducting 44. The dimensions D2 and D4 of splitters 42 and 45, respectively, should each be more than 2 feet, with dimension D2 preferably being larger than dimension D4. In a preferred embodiment of the disclosed inlet duct silencer apparatus for a heavy duty gas turbine inlet system, the dimension D4 is 48", 36", 32" or 28", although it should be noted that this dimension can be modified for different applications with different noise reduction requirements.

Figure 5:
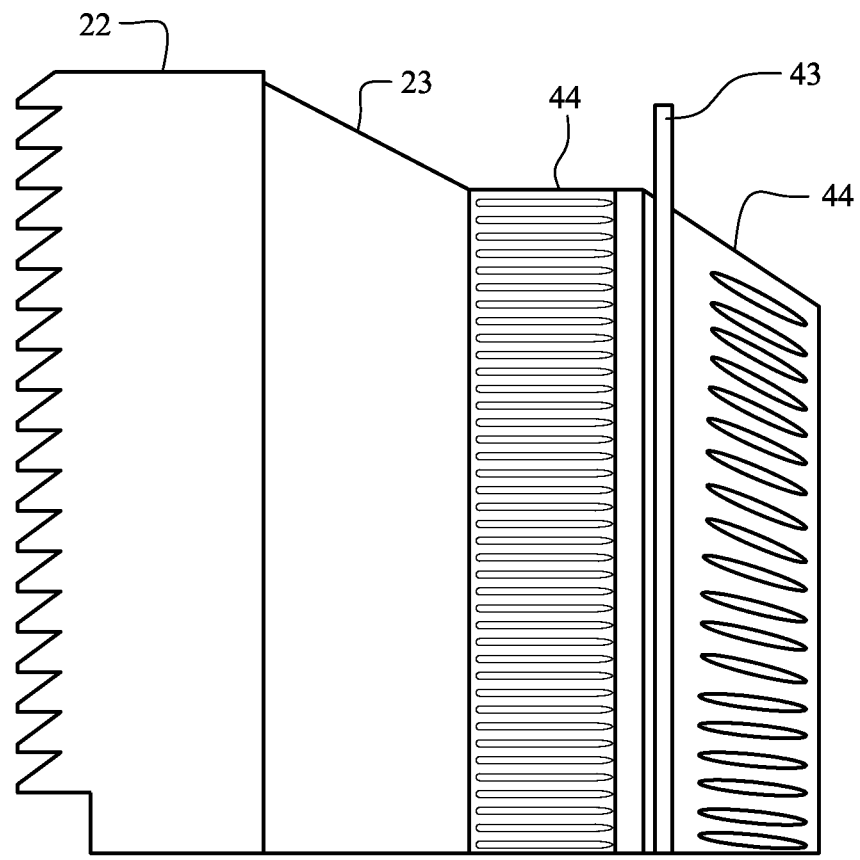
FIG. 5 is a simplified side elevational schematic diagram of the filter and intake ducting and main silencers and pre-silencers used to form the improved inlet silencer of the present invention for a gas turbine.

FIG. 5 is a simplified side elevational schematic diagram of the filter and intake ducting and the main silencer splitters and the pre-silencer splitters used to form the improved inlet silencer of the present invention for a gas turbine. Here again, the inlet air 41 flows from left to right and noise propagates from right to left, as in FIG. 4, such that air 11 coming into the compressor 12/combustor 14 and then turbine 16 is filtered by an inlet filter located in an air filter house 22. The filtered air from the inlet filter house 22 is then passed to the outlet plenum 23 and then to the inlet duct 44, which contains the inlet silencer 40. Preferably, the bottom wall of the inlet duct 44 is located on ground (or close to the ground), so as to not require insulation. The inlet silencer 40 includes the main silencer, i.e., the plurality of sound-absorbing splitters 42, the turbine IBH 43 and the pre-silencer, i.e., the plurality of sound-absorbing splitters 45, which are located downstream from the main silencers 42 and the IBH 43.

The pre-silencer splitters 45 provide at least three advantages. First, they decrease the turbine noise to lower level of 20 dB or up to 40 dB. Second, they make the flow/temperature distribution more uniform in the air flow passage to the compressor 12 inlet, such that it can help the IBH for better mixing the hot air from compressor discharge with the ambient air. The reduced temperature distortion is beneficial to compressor surge margin. Lastly, since the pre-silencers are very close to the source of noise from compressor 12, the reduced noise level after the pre-silencer splitters needs less insulation for the upstream section of the duct, which can be a cost savings.

Figure 6A:
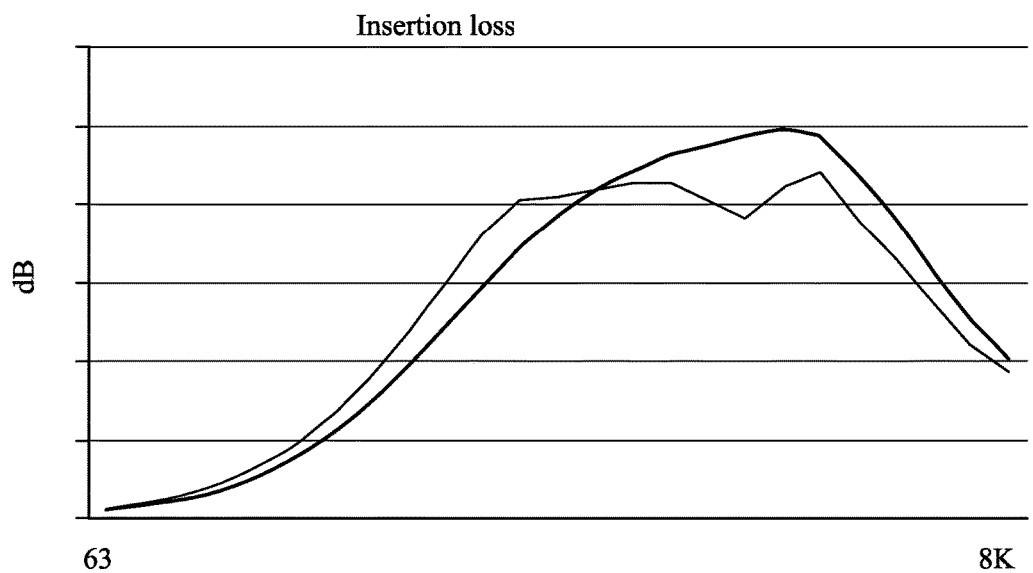
FIG. 6A is a plot of two graphs of the insertion loss for the disclosed inlet duct silencer design and the prior inlet duct silencer design.
Figure 6B:
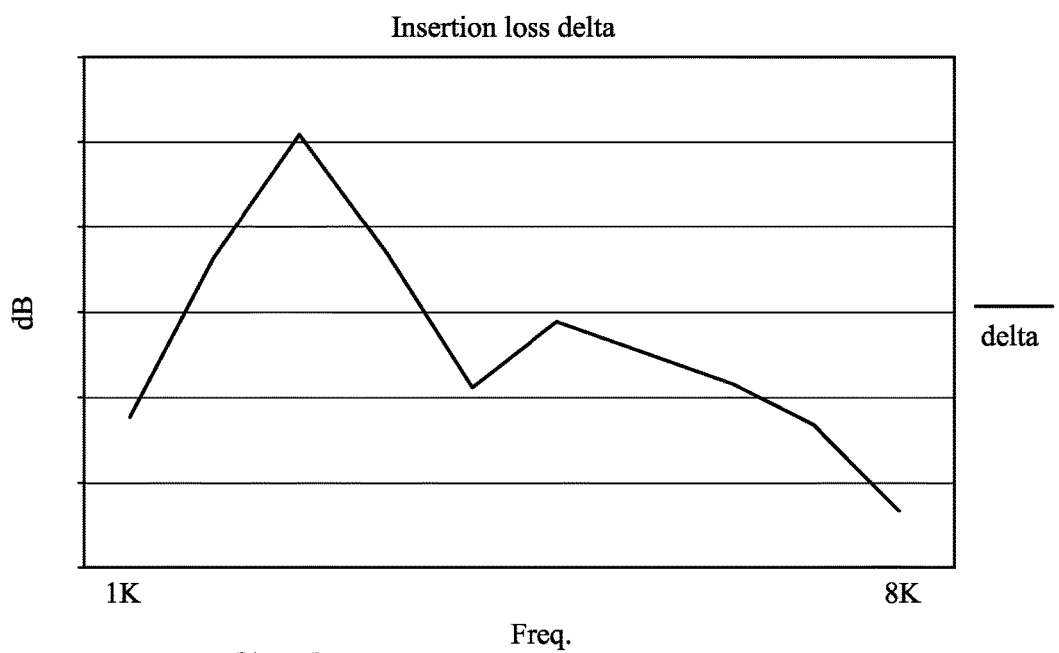
FIG. 6B is a plot of the difference (or delta) between the two plots shown in FIG. 6A.

The disclosed inlet duct silencer apparatus provides significantly better acoustic performance of around 8 dB higher insertion loss than that of the prior inlet duct silencer design. Two graphs of the insertion loss for the disclosed inlet duct silencer design and the prior inlet duct silencer design are shown in FIG. 6A. "Insertion Loss" can be defined as the reduction of noise level at a given location due to placement of a noise control device in the sound path between the sound source and that location. Usually rated in octave bands or ⅓-octave bands. It can be seen from FIG. 6A that the insertion loss plot 60 in "dB" for the disclosed inlet duct silencer design is lower than the insertion loss plot 62, again in "dB", for the prior inlet duct silencer design. To help achieve the insertion loss plot 60, the walls between the two silencers in the disclosed design are insulated. The difference (or delta) plot 64 between the two plots 60 and 62 in FIG. 6A is shown in FIG. 6B. It can be seen from FIGS. 6A and 6B that the delta between plots 60 and 62 decreases as the frequency increases.

In addition, the pressure drop produced in disclosed inlet duct silencer is less than the pressure drop produced in the prior inlet duct silencer design because the overall length of the silencer is decreased. An increase in pressure drop at the air intake system of a gas turbine affects the power output of the turbine, since gas turbines tend to make more power when the air flow through the turbine is high. Pressure drop is defined as the difference in pressure between two points of a fluid carrying network. High flow velocities and/or high fluid viscosities result in a larger pressure drop, while low velocity will result in lower or no pressure drop. The prior inlet duct silencer design, which produces a streamlined flow pattern at a horizontal plane passing through the center of the IBH pipe, produces a pressure drop equal to ~0.75" water column (WC). In contrast, the pressure drop produced in disclosed inlet duct silencer, which produces a faster diffusion/mixing of IBH flow with background flow, produces a pressure drop equal to ~0.71" WC.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A silencer apparatus for an inlet system of a gas turbine including an Inlet Bleed Heat, the silencer apparatus comprising:
    a main silencer disposed along a gas flow direction in the gas turbine inlet ducting, and
    a pre-silencer also disposed along the gas flow direction in the gas turbine inlet ducting,
    the Inlet Bleed Heat being located between the main silencer and the pre-silencer.

2. The silencer apparatus of claim 1, wherein the main silencer is comprised of a first plurality of sound-absorbing splitters which are disposed along the gas flow direction in the gas turbine inlet ducting, and
    wherein the pre-silencer is comprised of a second plurality of sound-absorbing splitters which are also disposed along the gas flow direction in the gas turbine inlet ducting.

3. The silencer apparatus of claim 2, wherein the first plurality of sound-absorbing splitters are disposed in parallel along the gas flow direction in the gas turbine intake ducting, and the second plurality of sound-absorbing splitters are disposed in parallel along the gas flow direction in the gas turbine intake ducting.

4. The silencer apparatus of claim 2, wherein the first plurality of splitters is located upstream in the gas flow in the gas turbine intake ducting from the second plurality of splitters, closer to the turbine's air filter house than the second plurality of splitters.

5. The silencer apparatus of claim 2, wherein the second plurality of splitters is located downstream in the gas flow from the first plurality of splitters, closer to the inlet to an air compressor inputting air to the turbine than the first plurality of splitters.

6. The silencer apparatus of claim 2, wherein each of the first plurality of splitters has a first pre-determined dimension, which is measured along the gas flow direction in the gas turbine inlet ducting, and each of the second plurality of splitters has a second predetermined dimension, which is measured along the gas flow direction in the gas turbine inlet ducting, and which is less than the first pre-determined dimension.

7. The silencer apparatus of claim 2, wherein leading edges of the second plurality of splitters are located a predetermined distance behind trailing edges of the first plurality of splitters, the predetermined distance being measured along the gas flow direction in the gas turbine inlet ducting.

8. The silencer apparatus of claim 2, wherein each of the first and second pluralities of splitters is made of a steel frame covered by steel perforated plates that contain sound absorption materials.

9. The silencer apparatus of claim 8, wherein the sound absorption materials are mineral wools.

10. The silencer apparatus of claim 2, wherein the second plurality of splitters is positioned with respect to the first plurality of splitters so that the first and second pluralities of splitters are staggered with respect to one other along the gas flow direction in the gas turbine inlet ducting.

11. The silencer apparatus of claim 10, wherein the first and second pluralities of splitters are staggered with respect to one another so as to thereby block a direct line of travel for noise in the form of acoustical waves from the compressor and/or turbine travelling opposite the gas flow direction in the gas turbine inlet ducting.

12. The silencer apparatus of claim 2, wherein the longitudinal dimensions of each of the first and second pluralities of splitters is more than 2 feet, with the longitudinal dimension of each of the first plurality of splitters being larger than the longitudinal dimension of each of the second plurality of splitters.

13. A silencer apparatus for an inlet system of a gas turbine including an Inlet Bleed Heat, the silencer apparatus comprising:

a first plurality of sound-absorbing splitters which are disposed in parallel along a gas flow direction in the gas turbine inlet ducting, and a second plurality of sound-absorbing splitters which are disposed in parallel along the gas flow direction in the gas turbine inlet ducting, the turbine Inlet Bleed Heat being located between the first and second pluralities of splitters, and the second plurality of splitters being positioned with respect to the first plurality of splitters so that the first and second pluralities of splitters are staggered with respect to one other along the gas flow direction in the gas turbine inlet ducting so as to thereby block a direct line of travel for noise in the form of acoustical waves from the compressor and/or turbine travelling opposite the gas flow direction in the gas turbine inlet ducting.

14. The silencer apparatus of claim 13, wherein each of the first and second pluralities of splitters is made of a steel frame covered by steel perforated plates that contain sound absorption materials.

15. The silencer apparatus of claim 13, wherein each of the first plurality of splitters has a first pre-determined dimension, which is measured along the gas flow direction in the gas turbine inlet ducting, and each of the second plurality of splitters has a second predetermined dimension, which is measured along the gas flow direction in the gas turbine inlet ducting, and which is less than the first pre-determined dimension.

16. The silencer apparatus of claim 13, wherein leading edges of the second plurality of splitters are located a predetermined distance behind trailing edges of the first plurality of splitters, the predetermined distance being measured along the gas flow direction in the gas turbine inlet ducting.

17. The silencer apparatus of claim 13, wherein the longitudinal dimensions of each of the first and second pluralities of splitters is more than 2 feet, with the longitudinal dimension of each of the first plurality of splitters being larger than the longitudinal dimension of each of the second plurality of splitters.

18. The silencer apparatus of claim 13, wherein each of the first plurality of splitters has a first pre-determined dimension, which is measured along the gas flow direction in the gas turbine inlet ducting, and each of the second plurality of splitters has a second predetermined dimension, which is measured along the gas flow direction in the gas turbine inlet ducting, and which is less than the first predetermined dimension.

19. The silencer apparatus of claim 13, wherein the first plurality of splitters is located upstream in the gas flow in the gas turbine intake ducting from the second plurality of splitters, closer to the turbine's air filter house than the second plurality of splitters, and wherein the second plurality of splitters is located downstream in the gas flow from the first plurality of splitters, closer to the inlet to an air compressor inputting air to the turbine than the first plurality of splitters.

20. A silencer apparatus for a gas turbine inlet system comprising:

a main silencer comprised of a first plurality of sound-absorbing splitters which are disposed in parallel along the gas flow direction in the gas turbine inlet ducting, and a pre-silencer comprised of a second plurality of sound-absorbing splitters which are disposed in parallel along the gas flow direction in the gas turbine inlet ducting, leading edges of the second plurality of splitters being located a predetermined distance behind trailing edges of the first plurality of splitters, the predetermined distance being measured along the gas flow direction in the gas turbine inlet ducting, the turbine Inlet Bleed Heat being located between the main silencer and the pre-silencer or the first and second pluralities of splitters, the second plurality of splitters being positioned with respect to the first plurality of splitters so that the first and second pluralities of splitters are staggered with respect to one other along the gas flow direction in the gas turbine inlet ducting so as to thereby block a direct line of travel for noise in the form of acoustical waves from the compressor and/or turbine travelling opposite the gas flow direction in the gas turbine inlet ducting, each of the first and second pluralities of splitters being made of a steel frame covered by steel perforated plates that contain sound absorption materials.

* * * * *

UNITED STATES PATENT AND TRADEMARK OFFICE
CERTIFICATE OF CORRECTION

| | | |
|---|---|---|
| PATENT NO. | : 9,890,713 B2 | Page 1 of 1 |
| APPLICATION NO. | : 14/638472 | |
| DATED | : February 13, 2018 | |
| INVENTOR(S) | : Hua Zhang et al. | |

It is certified that error appears in the above-identified patent and that said Letters Patent is hereby corrected as shown below:

In the Specification

Column 4, Line 21, change "ile another might use or" to --while another might use--

Signed and Sealed this
Tenth Day of April, 2018

Andrei Iancu
*Director of the United States Patent and Trademark Office*